(12) United States Patent
Nishio et al.

(10) Patent No.: US 10,644,745 B2
(45) Date of Patent: *May 5, 2020

(54) COMMUNICATION APPARATUS AND COMMUNICATION METHOD

(71) Applicant: Godo Kaisha IP Bridge 1, Tokyo (JP)

(72) Inventors: Akihiko Nishio, Osaka (JP); Katsuhiko Hiramatsu, Kanagawa (JP); Isamu Yoshii, Chiba (JP)

(73) Assignee: Godo Kaisha IP Bridge 1, Tokyo (JP)

( * ) Notice: Subject to any disclaimer, the term of this patent is extended or adjusted under 35 U.S.C. 154(b) by 297 days.

This patent is subject to a terminal disclaimer.

(21) Appl. No.: 14/811,442

(22) Filed: Jul. 28, 2015

(65) Prior Publication Data

US 2015/0333882 A1    Nov. 19, 2015

Related U.S. Application Data

(63) Continuation of application No. 13/895,883, filed on May 16, 2013, now Pat. No. 9,143,192, which is a
(Continued)

(30) Foreign Application Priority Data

Apr. 4, 2003    (JP) .................................. 2003-102018

(51) Int. Cl.
*H04B 1/713* (2011.01)
*H04B 1/715* (2011.01)
(Continued)

(52) U.S. Cl.
CPC ............ *H04B 1/713* (2013.01); *H04B 1/715* (2013.01); *H04L 5/006* (2013.01); *H04L 5/0012* (2013.01);
(Continued)

(58) Field of Classification Search
CPC ... H04L 5/0053; H04L 5/0007; H04L 1/1861; H04L 5/0094; H04L 5/006; H04L 5/0012;
(Continued)

(56) References Cited

U.S. PATENT DOCUMENTS

| 4,405,840 A | 9/1983 | Zebo |
| 4,426,729 A | 1/1984 | Gritton |

(Continued)

FOREIGN PATENT DOCUMENTS

| CN | 1301089 | 6/2001 |
| CN | 1343409 | 4/2002 |

(Continued)

OTHER PUBLICATIONS

English translation of Chinese Search Report which is an annex to the Chinese Office Action dated Dec. 16, 2013.
(Continued)

*Primary Examiner* — Christopher P Grey
(74) *Attorney, Agent, or Firm* — Seed IP Law Group LLP

(57) ABSTRACT

In order to reduce interference between cells through hopping and use frequencies in a good propagation situation, a scheduler section carries out scheduling for determining to which user data should be sent using CQI from each communication terminal apparatus, selects a user signal to be sent in the next frame and determines in which subcarrier block the data should be sent. An MCS decision section selects a modulation scheme and coding method from the CQI of the selected user signal. A subcarrier block selection section selects a subcarrier block instructed by the scheduler section 102 for each user signal. For the respective subcarrier blocks, FH sequence selection sections select hopping patterns. A subcarrier mapping section maps the user signal and control data to subcarriers according to the selected hopping pattern.

7 Claims, 14 Drawing Sheets

Related U.S. Application Data continuation of application No. 12/643,507, filed on Dec. 21, 2009, now Pat. No. 8,467,797, which is a continuation of application No. 10/550,557, filed as application No. PCT/JP2004/004875 on Apr. 2, 2004, now Pat. No. 7,660,367.

(51) Int. Cl.
| | | |
|---|---|---|
| *H04W 72/04* | (2009.01) | |
| *H04W 72/12* | (2009.01) | |
| *H04L 5/00* | (2006.01) | |
| *H04L 1/00* | (2006.01) | |

(52) U.S. Cl.
CPC ... *H04W 72/0453* (2013.01); *H04W 72/1231* (2013.01); *H04L 1/0003* (2013.01); *H04L 1/0009* (2013.01)

(58) Field of Classification Search
CPC ..... H04L 1/0009; H04L 1/0003; H04B 1/713; H04B 1/715; H04W 72/0453; H04W 72/1231

See application file for complete search history.

(56) References Cited

U.S. PATENT DOCUMENTS

| | | | |
|---|---|---|---|
| 4,491,701 A | 1/1985 | Duttweiler | |
| 5,726,978 A * | 3/1998 | Frodigh | H04L 5/0007 370/252 |
| 5,870,391 A * | 2/1999 | Nago | H04B 1/713 370/330 |
| 6,496,532 B1 * | 12/2002 | Raitola | H04B 1/713 375/132 |
| 6,553,019 B1 | 4/2003 | Laroia | |
| 6,662,367 B2 | 12/2003 | Dapper | |
| 7,016,319 B2 * | 3/2006 | Baum | H04W 72/082 370/329 |
| 7,106,689 B1 * | 9/2006 | Sudo | H04L 1/04 370/208 |
| 7,126,996 B2 | 10/2006 | Classon | |
| 7,236,804 B2 | 6/2007 | Immendorf | |
| 7,272,162 B2 | 9/2007 | Sano | |
| 7,356,094 B1 | 4/2008 | Ikeda | |
| 7,660,367 B2 | 2/2010 | Nishio | |
| 8,467,797 B2 | 6/2013 | Nishio | |
| 2002/0119781 A1 * | 8/2002 | Li | H04L 1/0003 455/450 |
| 2002/0147017 A1 * | 10/2002 | Li | H04L 1/0003 455/447 |
| 2002/0159426 A1 | 10/2002 | Kanemoto et al. | |
| 2004/0109419 A1 * | 6/2004 | Sano | H04B 1/7136 370/320 |
| 2004/0190482 A1 | 9/2004 | Baum | |
| 2005/0014532 A1 | 1/2005 | Immendorf | |
| 2006/0205412 A1 | 9/2006 | Oh | |
| 2006/0215603 A1 | 9/2006 | Nishio | |
| 2006/0293087 A1 | 12/2006 | Tsutsui | |
| 2007/0015511 A1 | 1/2007 | Kwun | |
| 2007/0254693 A1 | 11/2007 | Furukawa | |
| 2007/0259635 A1 | 11/2007 | Oh | |
| 2008/0159251 A1 | 7/2008 | Shiokawa | |
| 2008/0240216 A1 | 10/2008 | Kolding | |
| 2009/0097465 A1 | 4/2009 | Inoue | |
| 2009/0149187 A1 | 6/2009 | Miki | |
| 2009/0232062 A1 | 9/2009 | Higuchi | |
| 2010/0048236 A1 | 2/2010 | Higuchi | |
| 2010/0097998 A1 | 4/2010 | Nishio | |
| 2010/0104044 A1 | 4/2010 | Kishigami | |
| 2010/0184447 A1 | 7/2010 | Miki | |

FOREIGN PATENT DOCUMENTS

| | | | | |
|---|---|---|---|---|
| EP | 1033853 | * | 9/2000 | ............ H04L 27/26 |
| EP | 1 043 861 | | 10/2000 | |
| EP | 1107637 A1 | * | 6/2001 | ............ H04W 72/02 |
| EP | 1 330 045 | | 7/2003 | |
| JP | 2000-286822 | | 6/2001 | |
| JP | 2001-156739 | | 6/2001 | |
| JP | 2002-135230 | | 5/2002 | |
| WO | 02/49306 | | 6/2002 | |

OTHER PUBLICATIONS

European Search Report dated Oct. 5, 2012.
Japanese Office Action dated Mar. 7, 2006, with Engiish translation.
PCT International Search Report dated Jun. 22, 2004.
3GPP TSG-RAN-1 Meeting #28, "Reference OFDM Physical Layer Configuration," Nortel Networks, R1-02-1028, Aug, 19-22, 2002, pp. 1-12.
Y. Hara, et al., "MC-CDM System for Packet Communications Using Frequency Scheduling," The Institute of Electronics, Information and Communications Engineers, Technical Report of IEICE, vol. 102, No. 206, Jul. 19, 2002, pp. 61-66, with English Abstract and partial English translation.
H. Iophi, et al., "A Study of Selection Method for Transport Block Size on HSDPA," The Institute of Electronics, Information and Communication Engineers, Proceedings of the 2003 IEICE General Conference, Mar. 19-22, 2003, p. 482, with partial English translation.
TSG-RAN-WG1 HSDPA , "Revised CQI Proposal," Motorola, Ericsson, R1-02-0675, Apr. 9-12, 2002, pp. 1-8.
IEEE Standard 802.16: "A Technical Overview of the Wireless-MAN Air Interface for Broadband Wireless Access," IEEE Communications Magazine, Jun. 2002, pp. 98-107.
R. Verdone, et al., "Dynamic Channel Allocation Schemes in Mobile Radio Systems with Frequency Hopping," 2001 12th IEEE International Symposium, Personal, Indoor and Mobile Radio Communications, vol. 2, Sep./Oct. 2001, pp. E-157- E-162.
3GPP TSG-RAN Meeting #28 bis, "Reference OFDM Physical Layer Configuration," Nortel Networks, R1-02-1222, Oct. 8-9, 2002, pp. 1-12.
Extended European Search Report, dated Jul. 1, 2019, for corresponding European Application No. 19158607.2-1220, 9 pages.

* cited by examiner

COMMUNICATION APPARATUS AND COMMUNICATION METHOD

CROSS-REFERENCE TO RELATED APPLICATIONS

This is a continuation of application Ser. No. 13/895,883 filed May 16, 2013, which is a continuation of application Ser. No. 12/643,507 filed Dec. 21, 2009, which is a continuation of application Ser. No. 10/550,557 filed Sep. 23, 2005, which is a 371 application of PCT/JP2004/004875 filed Apr. 2, 2004, which is based on Japanese Application No. 2003-102018 filed Apr. 4, 2003, the entire contents of each of which are incorporated by reference herein.

TECHNICAL FIELD

The present invention relates to a base station apparatus and communication method, and more particularly, to a base station apparatus and communication method suitable for use in an OFDM scheme.

BACKGROUND ART

OFDM (Orthogonal Frequency Division Multiplexing) is attracting attention as a high-speed transmission technology resistant to multipath interference. FH-OFDM (Frequency hopping-OFDM) is a scheme whereby OFDM subcarriers that are used hop around, over time, and is used in, for example, IEEE802.16, as an access scheme that is capable of achieving frequency diversity effect (see, for example, "IEEE Standard 802.16: A technical overview of the Wireless MAN Air Interface for broadband wireless access", pp. 98-107, IEEE Communication Magazine, June, 2002).

Furthermore, FH-OFDM also has an effect of averaging interference between cells in a cellular environment and is drawing attention as a future high-speed radio transmission technology. Furthermore, the 3GPP is also studying the introduction of FH-OFDM.

In FH-OFDM, base station apparatuses carry out transmission according to their respective FH patterns. An FH pattern is a pattern related to time transition and an operating frequency (subcarrier) and each base station apparatus is assigned a unique FH pattern. The frequency of FH (frequency hopping) may be once every symbol or every slot (or frame). Here, suppose FH for every symbol. Because a frequency is used over a wide range, effects of FH include a frequency diversity effect and a temporal averaging effect against interference between cells.

As a method for implementing FH, for example, a method of using frequency interleave and a method of using a pattern generated by a random sequence such as a PN sequence may be available. For simplicity, the latter will be explained here.

Furthermore, for the purpose of channel allocation per cell, there is a proposal to divide a band into subchannels and carry out DCA (Dynamic Channel Allocation) in subchannel units (e.g., see "Dynamic channel allocation schemes in mobile radio systems with frequency hopping", Verdone, R.; Zanella, A.; Zuliani, L., pp. E-157-E-162, vol. 2, Personal, Indoor and Mobile Radio Communications, 2001 12th IEEE International Symposium on, September/October 2001).

A conventional base station apparatus and mobile station apparatus will be explained below. FIG. 1 is a block diagram showing the configuration of a conventional base station apparatus.

In FIG. 1, a scheduler section 11 carries out scheduling using CQI (Channel Quality Indicator) from each mobile station apparatus to determine to which user data should be sent. There are various scheduling algorithms such as an MaxC/I method and Round Robin method. Furthermore, a coding method (coding rate) and modulation scheme to be used are determined based on this CQI. A coding section 12 carries out coding such as turbo coding on user data. Furthermore, the coding section 12 also carries out processing like interleaving as required.

A transmission HARQ section 13 carries out processing necessary for HARQ. Details will be explained using FIG. 2. FIG. 2 is a block diagram showing the configuration of a transmission HARQ section of the conventional base station apparatus. As shown in FIG. 2, the transmission HARQ section 13 is constructed of a buffer 21 and a rate matching section 22. The buffer 21 stores a bit string of transmission data. The rate matching section 22 carries out rate matching determined by an RM parameter on the bit string of the transmission data and inputs punctured or repeated transmission data to a modulation section 14. The RM parameter may vary depending on a transmission count.

The modulation section 14 modulates the transmission data according to QPSK or QAM. A control data processing section 15 is constructed of a coding section 16 and a modulation section 17. The coding section 16 carries out coding on control data. The modulation section 17 modulates the control data. A multiplexing section 18 multiplexes (here, time multiplexing) the transmission data subjected to processing by the modulation section 14 with the control signal which has been likewise subjected to processing of coding and modulation.

Next, a subcarrier mapping section 19 assigns the transmission data and control signal to subcarriers according to a predetermined FH pattern. Likewise, the subcarrier mapping section 19 also maps pilot signals in such a way as to be distributed over the entire frequency band. Then, the subcarrier mapping section 19 outputs a transmission signal to which the transmission data, control signal and pilot signals are mapped to an S/P conversion section 20.

The S/P conversion section 20 converts the transmission signal from serial data to parallel data and outputs the parallel data to an IFFT section 21.

The IFFT section 21 carries out an IFFT (inverse fast Fourier transform) on the transmission signal which has been converted to the parallel data. A GI insertion section 22 inserts a GI (Guard Interval) into a transmission signal to enhance multipath resistance. A radio processing section 23 transmits the transmission signal after radio transmission processing.

The state of subcarriers used at this time is as shown in FIG. 3, for example. FIG. 3 illustrates an example of signals of the conventional base station apparatus. In FIG. 3, the vertical axis shows time and the horizontal axis shows subcarrier frequencies. As shown in FIG. 3, subcarriers carrying pilot signals and data signals vary every time unit.

In this way, a mobile station apparatus receives signals carried by time-varying subcarriers on which transmission signals are arranged. FIG. 4 is a block diagram showing the configuration of a conventional mobile station apparatus.

In FIG. 4, a radio processing section 51 carries out radio reception processing such as down-conversion on a received signal and obtains a baseband signal. A GI elimination section 52 eliminates the inserted GI. An FFT section 53 carries out FFT processing and thereby extracts the signals of the respective subcarriers. A subcarrier demapping section 54 demaps this received signal according to an FH pattern and extracts the signal assigned to the own station.

Next, a channel separation section 55 separates the received signal into a user signal, control signal and pilot. A demodulation section 56 demodulates the control signal and a decoding section 57 carries out decoding processing on the control signal subjected to the demodulation processing.

A demodulation section 58 demodulates the user signal. A reception HARQ section 59 saves a predetermined number of bits (here, soft decision bits) after the demodulation of the user signal. In the case of retransmission, the bits are combined with the reception bits previously stored. A decoding section 60 carries out decoding on turbo codes, etc., using the bit string to obtain user data. Here, though not shown, a channel estimation value calculated using pilot signals is used during demodulation processing. An ACK/NACK generation section 61 decides based on a CRC result of the decoded received data whether the received data includes errors or not and transmits an ACK signal or NACK signal over an uplink.

Furthermore, a CIR measuring section 62 calculates an average reception SIR of all subcarriers using pilot signals. A CQI generation section 63 generates CQI from the average reception SIR. A transmission section 64 transmits the CQI and ACK/NACK signal over the uplink.

However, while the conventional apparatus can achieve a frequency diversity effect by expanding a band used through frequency hopping, there is a problem that it cannot obtain effects of frequency scheduling whereby transmission is performed using frequencies in a good propagation path situation. Furthermore, since the frequency hopping range of the conventional apparatus extends over a wide band, an amount of control information becomes enormous when hopping patterns are assigned to the respective users as channel resources.

Furthermore, according to conventional frequency scheduling whereby packets are transmitted using frequencies of good reception quality, when a base station apparatus in an adjacent cell also assigns the same frequency to other mobile station apparatuses, it may not be possible to receive packets due to interference.

DISCLOSURE OF INVENTION

It is an object of the present invention to provide a base station apparatus and communication method capable of reducing interference between cells through hopping, using frequencies in a good propagation situation, realizing high-speed transmission and reducing an amount of control information on resource assignment.

In order to achieve the above described object, the present invention divides a communication frequency band into subcarrier blocks, selects a subcarrier block to be used in a frame through frequency scheduling and causes each user signal to be subjected to frequency hopping within the selected block. Through this hopping, it is possible to reduce interference between cells and use frequencies in a good propagation situation. As a result, it is possible to realize faster transmission.

Thus, the present invention is intended to enhance the frequency scheduling effect by narrowing the hopping range and particularly effective in an environment with a large number of users and large delay variance. Furthermore, the present invention can reduce the number of patterns of frequency hopping by dividing a band into subcarrier blocks and reduce an amount of control information for resource assignment.

BEST MODE FOR CARRYING OUT THE INVENTION

With reference now to the attached drawings, embodiments of the present invention will be explained in detail below.

Embodiment 1

This embodiment will explain a case with transmission using FH-OFDM where an operating frequency band is divided into subcarrier blocks and a base station apparatus selects a subcarrier block to be used in a frame for each user through frequency scheduling. Each user signal is subjected to frequency hopping within the block. With an operating frequency band divided into subcarrier blocks, it is possible to assign a frequency to a most suitable user. Furthermore, causing the operating subcarriers to hop within a block can reduce interference between cells.

Figure 1:
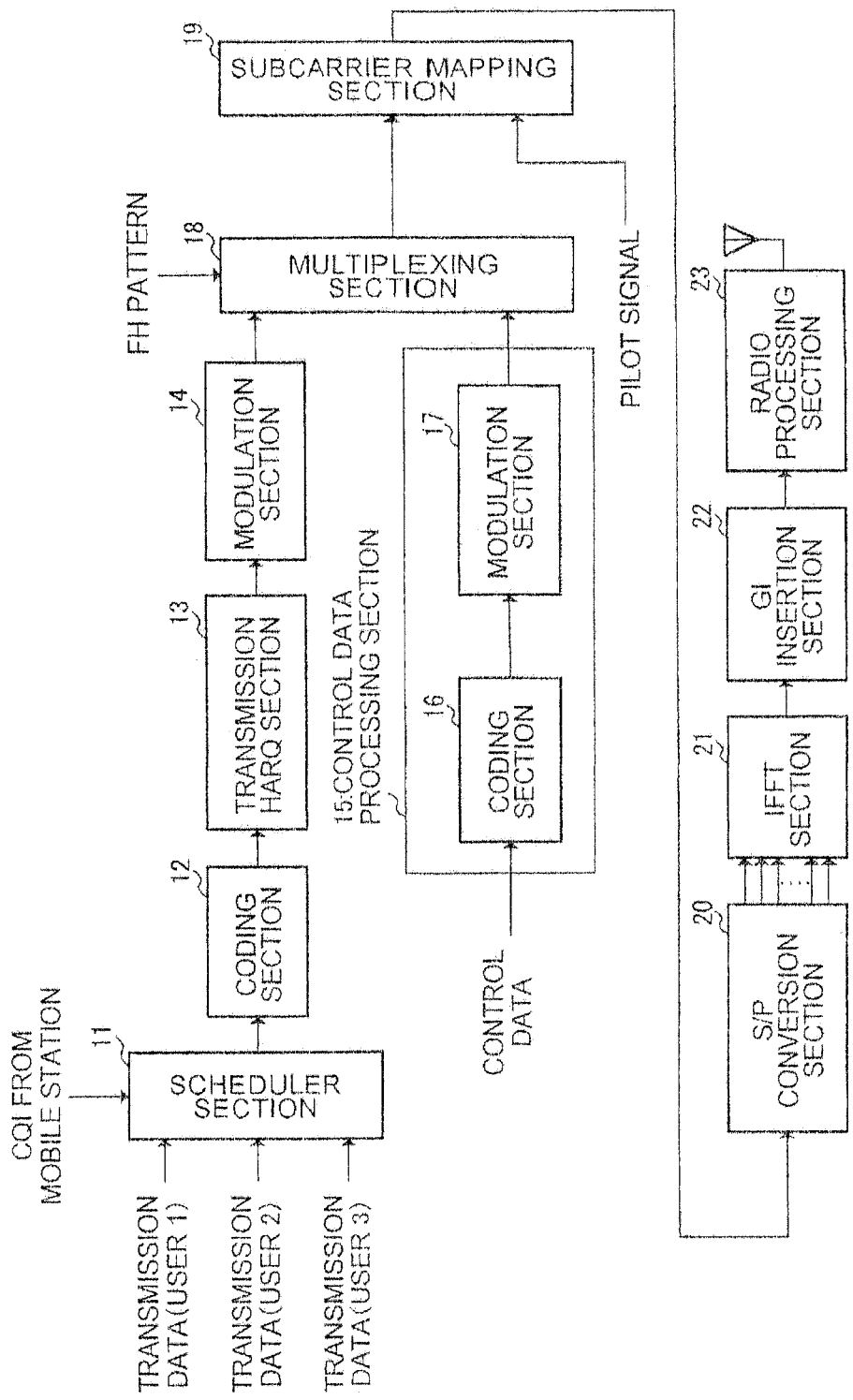
FIG. 1 is a block diagram showing the configuration of a conventional base station apparatus.
Figure 2:
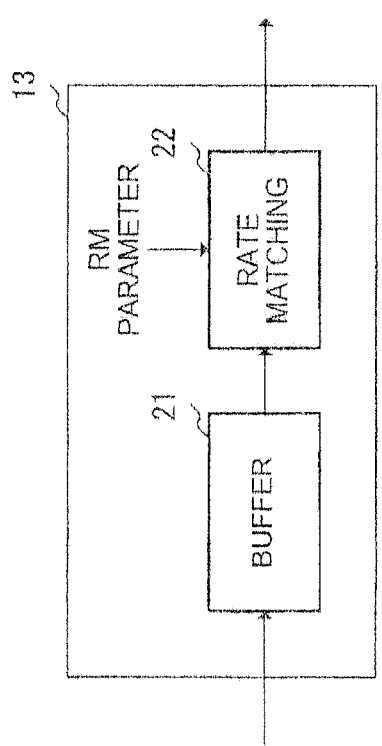
FIG. 2 is a block diagram showing the configuration of a transmission HARQ section of the conventional base station apparatus.
Figure 3:
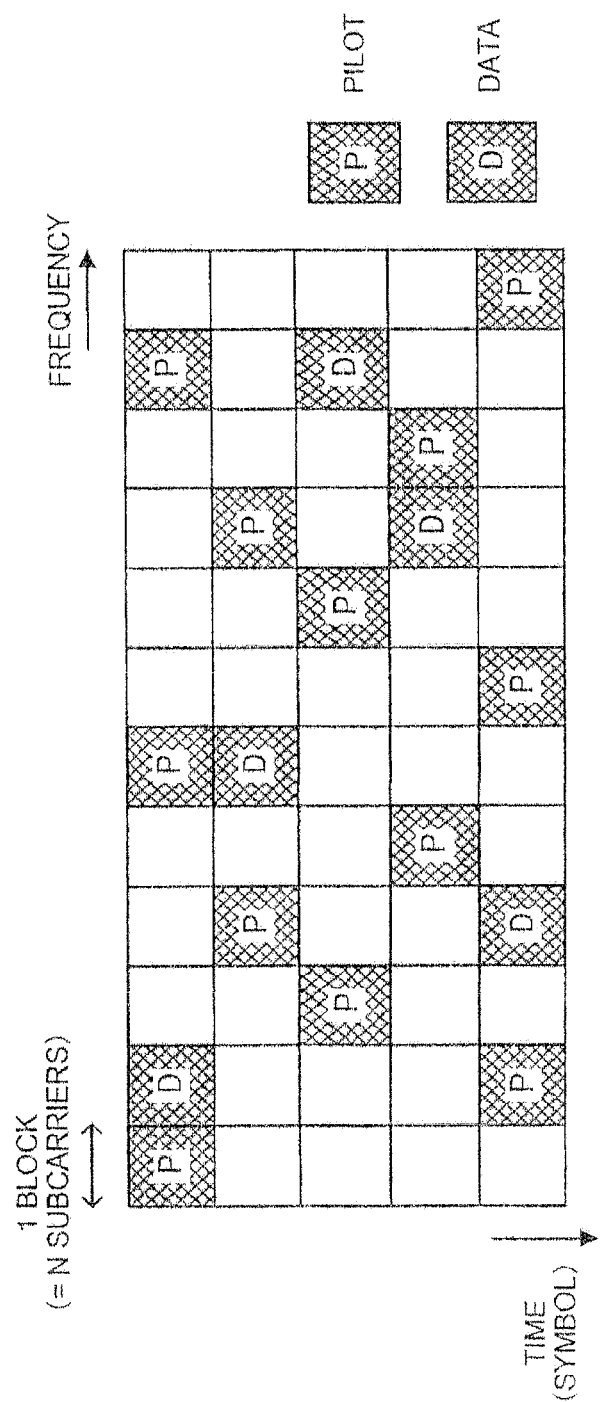
FIG. 3 illustrates an example of signals of the conventional base station apparatus.
Figure 4:
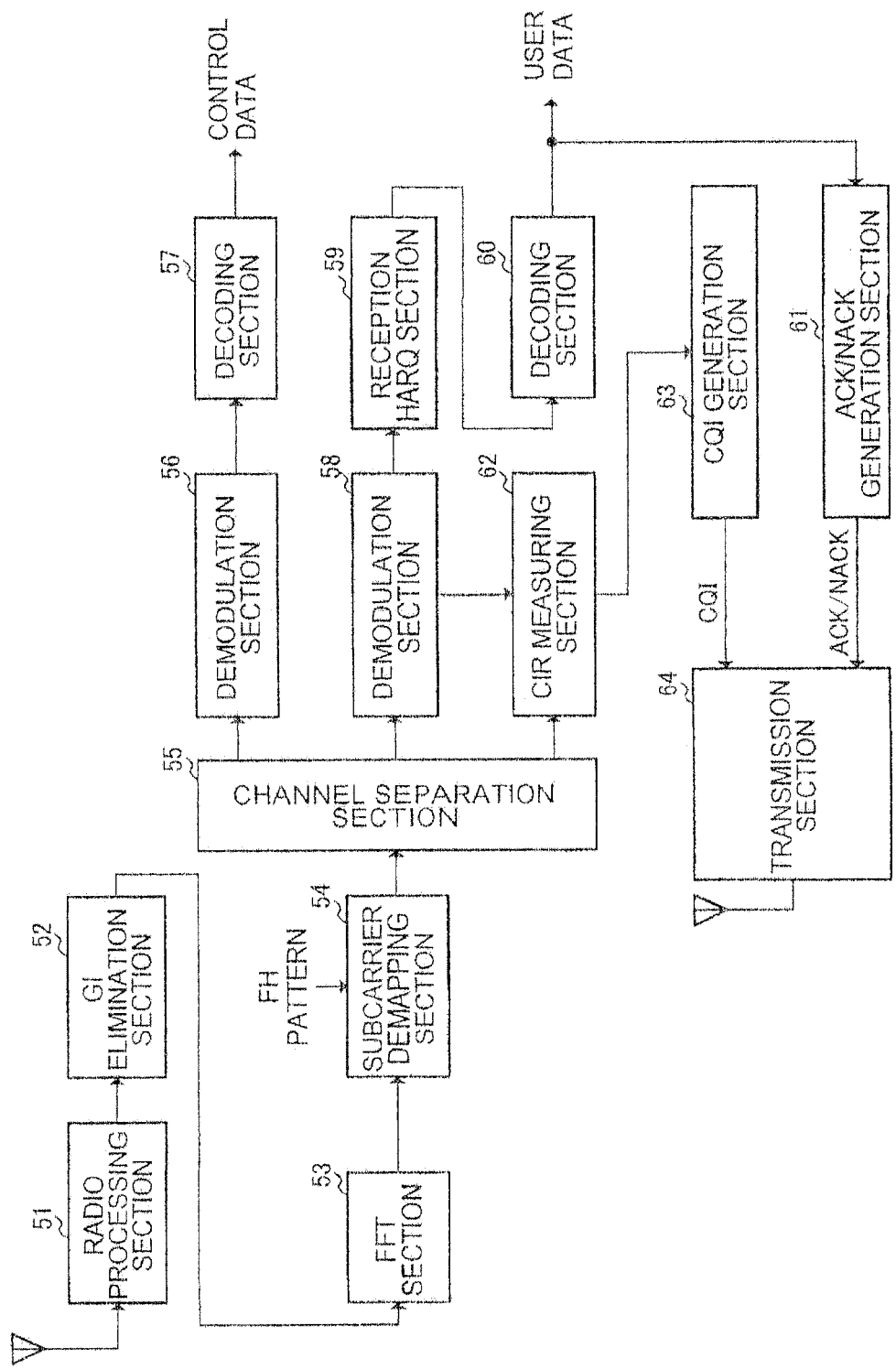
FIG. 4 is a block diagram showing the configuration of a conventional mobile station apparatus.
Figure 5:
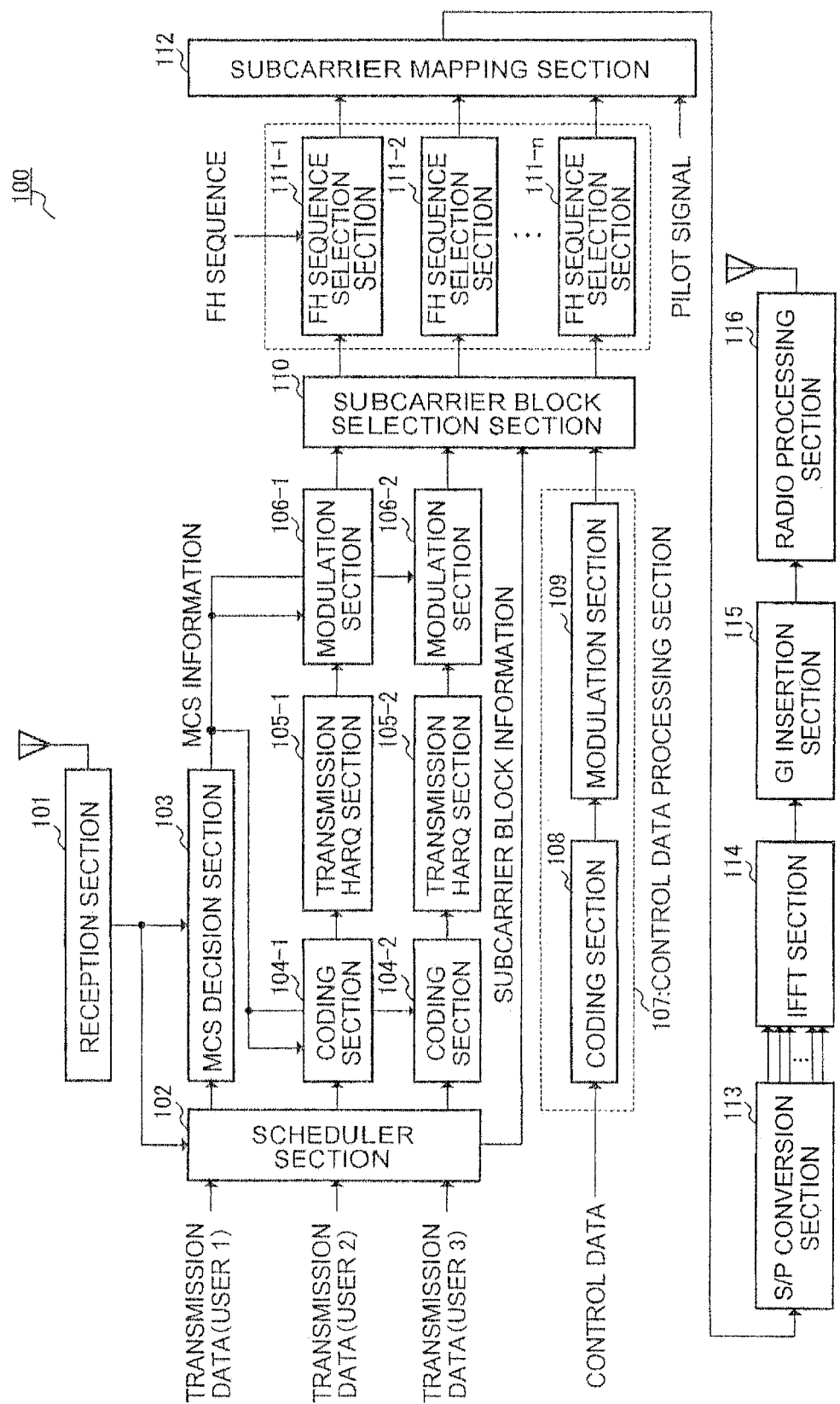
FIG. 5 illustrates a block diagram showing the configuration of a base station apparatus according to Embodiment 1 of the present invention.

FIG. 5 illustrates a block diagram showing the configuration of a base station apparatus according to Embodiment 1 of the present invention. The base station apparatus 100 in FIG. 5 is mainly constructed of a reception section 101, a scheduler section 102, an MCS decision section 103, a coding section 104-1, a coding section 104-2, a transmission HARQ section 105-1, a transmission HARQ section 105-2, a modulation section 106-1, modulation section 106-2, a control data processing section 107, a coding section 108, a modulation section 109, a subcarrier block selection section 110, FH sequence selection sections 111-1 to 111-n, a subcarrier mapping section 112, an S/P conversion section 113, an IFFT section 114, a GI insertion section 115 and a radio processing section 116.

In FIG. 5, the reception section 101 receives a received signal transmitted from a communication terminal apparatus which is the other party of communication, converts the frequency of this received signal to a baseband signal, decodes the baseband signal and extracts CQI. The reception section 101 outputs the CQI to the scheduler section 102 and MCS decision section 103.

The scheduler section 102 carries out scheduling of deciding to which user data should be transmitted using CQI from each communication terminal apparatus and selects a user signal to be transmitted in the next frame. As the scheduling method, algorithms such as MaxC/I method and Round Robin method are available. At this time, the scheduler section 102 also decides in which subcarrier block the user data should be transmitted and outputs the information to the subcarrier block selection section 110. Here, the scheduler section 102 selects a subcarrier block in an optimum propagation path.

The MCS decision section 103 selects a modulation scheme and coding method (coding rate) from the CQI of the selected user signal, outputs the coding scheme to the coding section 104-1 and coding section 104-2 and outputs the modulation scheme to the modulation sections 106-1 and 106-2.

The coding section 104-1 and coding section 104-2 carry out coding on user data through turbo coding, etc., according to a coding scheme instructed by the MCS decision section 103. Furthermore, the coding section 104-1 and coding section 104-2 also carry out processing such as interleaving as required. The coding section 104-1 and coding section 104-2 output the coded user data to the transmission HARQ section 105-1 and transmission HARQ section 105-2.

The transmission HARQ section 105-1 and transmission HARQ section 105-2 save the coded user data in an HARQ buffer and carry out rate matching processing of the coded user data according to a retransmission count. The coded user data is output to the modulation section 106-1 and modulation section 106-2.

The modulation section 106-1 and modulation section 106-2 modulate the user data according to the modulation scheme instructed by the MCS decision section 103 and output the modulated signal to the subcarrier block selection section 110.

The control data processing section 107 is constructed of the coding section 108 and modulation section 109. The coding section 108 carries out coding on the control data and outputs the control data to the modulation section 109. The modulation section 109 modulates the control data and outputs the modulated control data to the subcarrier block selection section 110.

The subcarrier block selection section 110 assigns subcarrier blocks instructed by the scheduler section 102 to their respective user signals. The FH sequence selection sections 111-1 to 111-n select hopping patterns for the respective subcarrier blocks.

For control data such as subcarrier block assignment information and MCS information, predetermined subcarrier blocks and FH sequences are selected. Therefore, the subcarrier block selection section 110 selects user signals that differ from the FH sequences of the control data.

Figure 6:
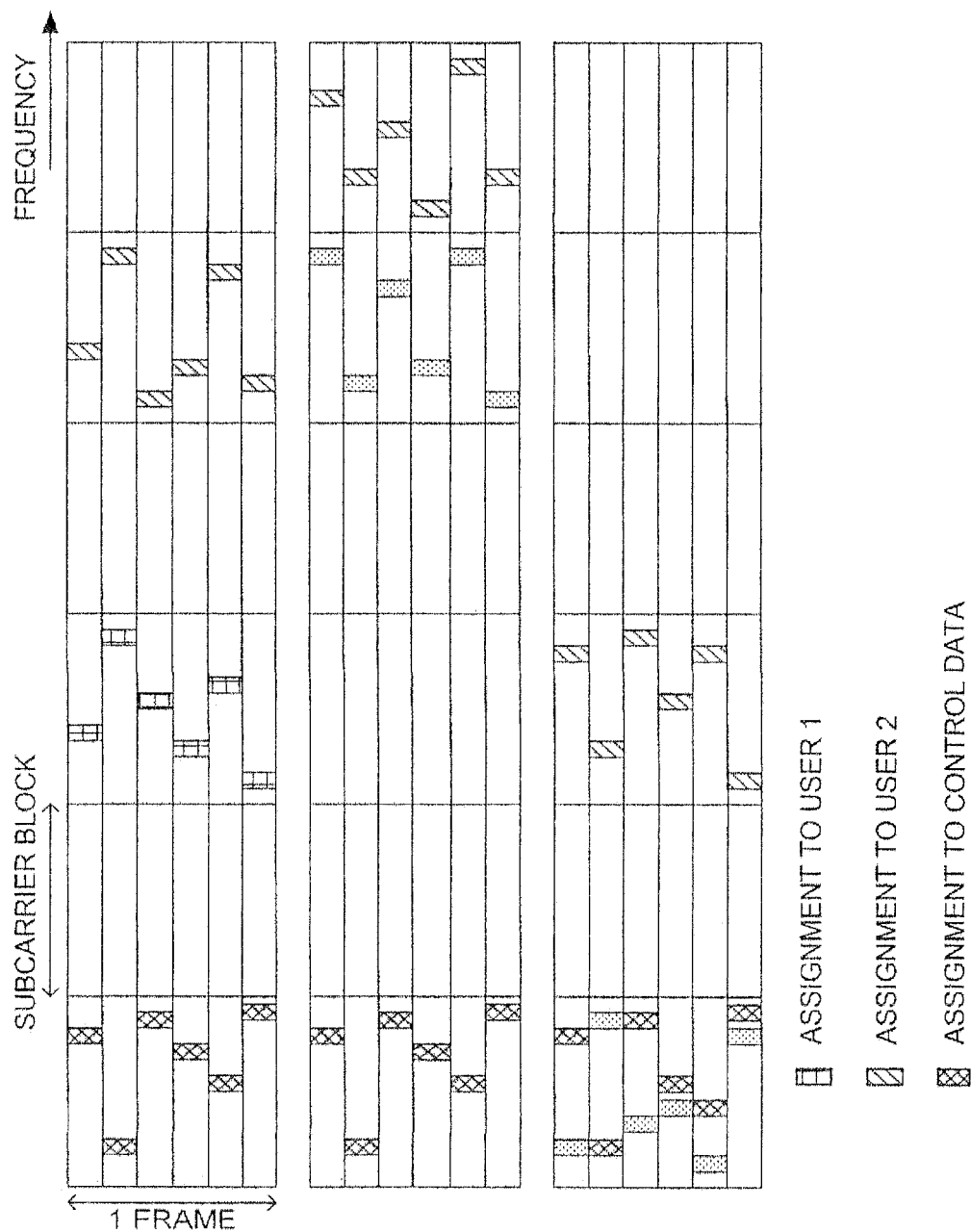
FIG. 6 illustrates an example of subcarrier mapping of the base station apparatus according to Embodiment 1 of the present invention.

Then, the subcarrier mapping section 112 maps the user signals and control data to subcarriers according to the selected hopping patterns. An example of mapping at this time is shown in FIG. 6. FIG. 6 shows an example of mapping of the subcarriers of the base station apparatus of this embodiment.

In FIG. 6, the horizontal axis shows subcarrier frequencies and the vertical axis shows time in frame units. As shown in FIG. 6, signals are subjected to frequency hopping in subcarrier block units. Subcarrier blocks for signal mapping are then determined for every frame. For the subcarrier blocks for signal mapping, subcarrier blocks whose propagation path quality is equal to or higher than predetermined quality are selected for every frame. Furthermore, though not shown, pilot signals are also mapped simultaneously.

The S/P conversion section 113 converts the mapped signal from serial data to parallel data and outputs the parallel data to the IFFT section 114. The IFFT section 114 subjects the transmission signal converted to the parallel data to IFFT (inverse fast Fourier transform). The GI insertion section 115 inserts a GI (Guard Interval) into the transmission signal to enhance multipath resistance. The radio processing section 116 converts the transmission signal to a radio frequency and transmits the signal.

Thus, according to the base station apparatus of this embodiment, a band is divided into subcarrier blocks, subcarrier blocks used are selected for every frame through frequency scheduling and each user signal is subjected to frequency hopping within the block. Through such hopping, it is possible to use frequencies in a good propagation situation while reducing interference between cells and transmit data at a high speed. Furthermore, it is possible to reduce the number of patterns of frequency hopping by dividing the band into subcarrier blocks and educe an amount of control information for resource assignment.

Figure 7:
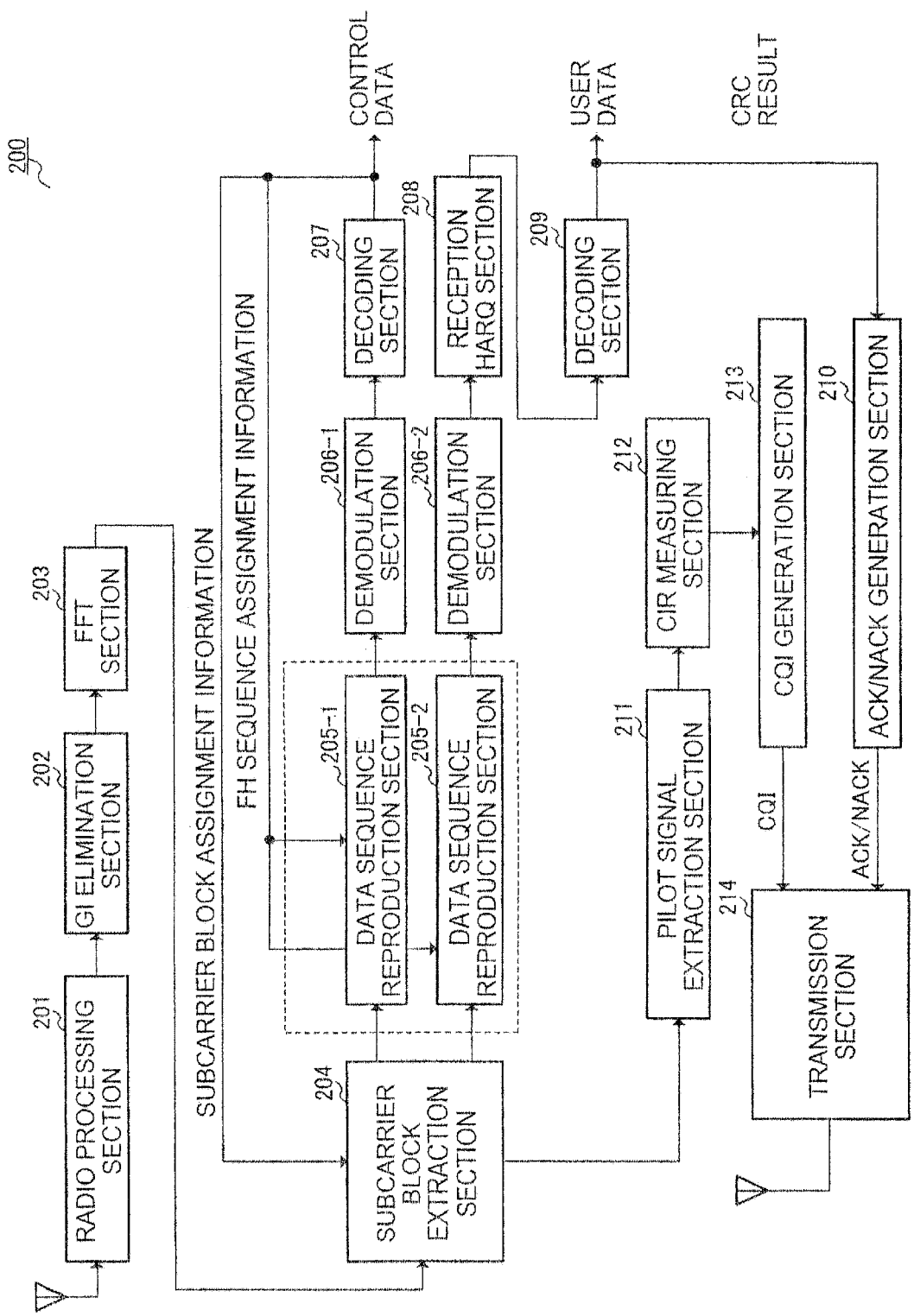
FIG. 7 is a block diagram showing the configuration of a communication terminal apparatus according to Embodiment 1 of the present invention.

Next, a communication terminal apparatus which communicates with the base station apparatus 100 will be explained. FIG. 7 is a block diagram showing the configuration of the communication terminal apparatus according to this embodiment. The communication terminal apparatus 200 in FIG. 7 is mainly constructed of a radio processing section 201, a GI elimination section 202, an FFT section 203, a subcarrier block extraction section 204, data sequence reproduction sections 205-1 and 205-2, demodulation sections 206-1 and 206-2, a decoding section 207, a reception HARQ section 208, a decoding section 209, an ACK/NACK generation section 210, a pilot signal extraction section 211, a CIR measuring section 212, a CQI generation section 213 and a transmission section 214.

In FIG. 7, the radio processing section 201 down-converts the received signal to a baseband signal and outputs the baseband signal to the GI elimination section 202. The GI elimination section 202 eliminates a GI from the received signal and outputs the received signal to the FFT section 203. The FFT section 203 transforms the received signal to a frequency domain through a fast Fourier transform and outputs the transformed signal to the subcarrier block extraction section 204.

The subcarrier block extraction section 204 separates the received signal into subcarrier blocks and outputs those blocks to the data sequence reproduction sections 205-1 and 205-2. The data sequence reproduction sections 205-1 and 205-2 carry out processing of restoring each data sequence which has been subjected to hopping to its original state. This processing is carried out using subcarrier block assignment information and FH sequence assignment information included in the control data. The data sequence reproduction section 205-1 outputs the processed received signal (control data) to the demodulation section 206-1. On the other hand, the data sequence reproduction section 205-2 outputs the processed received signal (user data) to the demodulation section 206-2.

The demodulation section 206-1 demodulates the received signal and outputs the demodulated signal to the decoding section 207. The demodulation section 206-2 demodulates the received signal and outputs the demodulated signal to the HARQ section 208.

The decoding section 207 decodes the demodulated received signal. The decoding section 207 outputs the subcarrier block assignment information included in the received signal to the subcarrier block extraction section 204 and outputs the FH sequence assignment information to the data sequence reproduction section 205-1 and data sequence reproduction section 205-2.

The reception HARQ section 208 combines the received signal with previous received data using a reception HARQ at the time of retransmission, saves data for new data and outputs the processed received signal to the decoding section 209. The decoding section 209 demodulates and decodes received signals to obtain user data. Furthermore, the decoding section 209 outputs CRC (Cycle Redundancy Check) information of the decoded user data to the ACK/NACK generation section 210.

The ACK/NACK generation section 210 generates an ACK signal or a NACK signal indicating whether user data has been received correctly or not and outputs the ACK signal or the NACK signal to the transmission section 214.

Here, subcarrier blocks and FH sequences to be used for the control data are predetermined, and therefore the control data is decoded first and then the user data is processed. Furthermore, the pilot signal extraction section 211 extracts pilot signals included in the respective blocks extracted by the subcarrier block extraction section 204 and outputs the pilot signals to the CIR measuring section 212. The CIR measuring section 212 measures a CIR for each subcarrier block. What should be measured as indicative of reception quality are not limited to the CIR but can also be reception power.

The CQI generation section 213 generates a CQI from the CIR and outputs the CQI signal to the transmission section 214. The transmission section 214 modulates an ACK signal or NACK signal and CQI signal and converts their frequencies and transmits the signals as radio signals.

Figure 8:
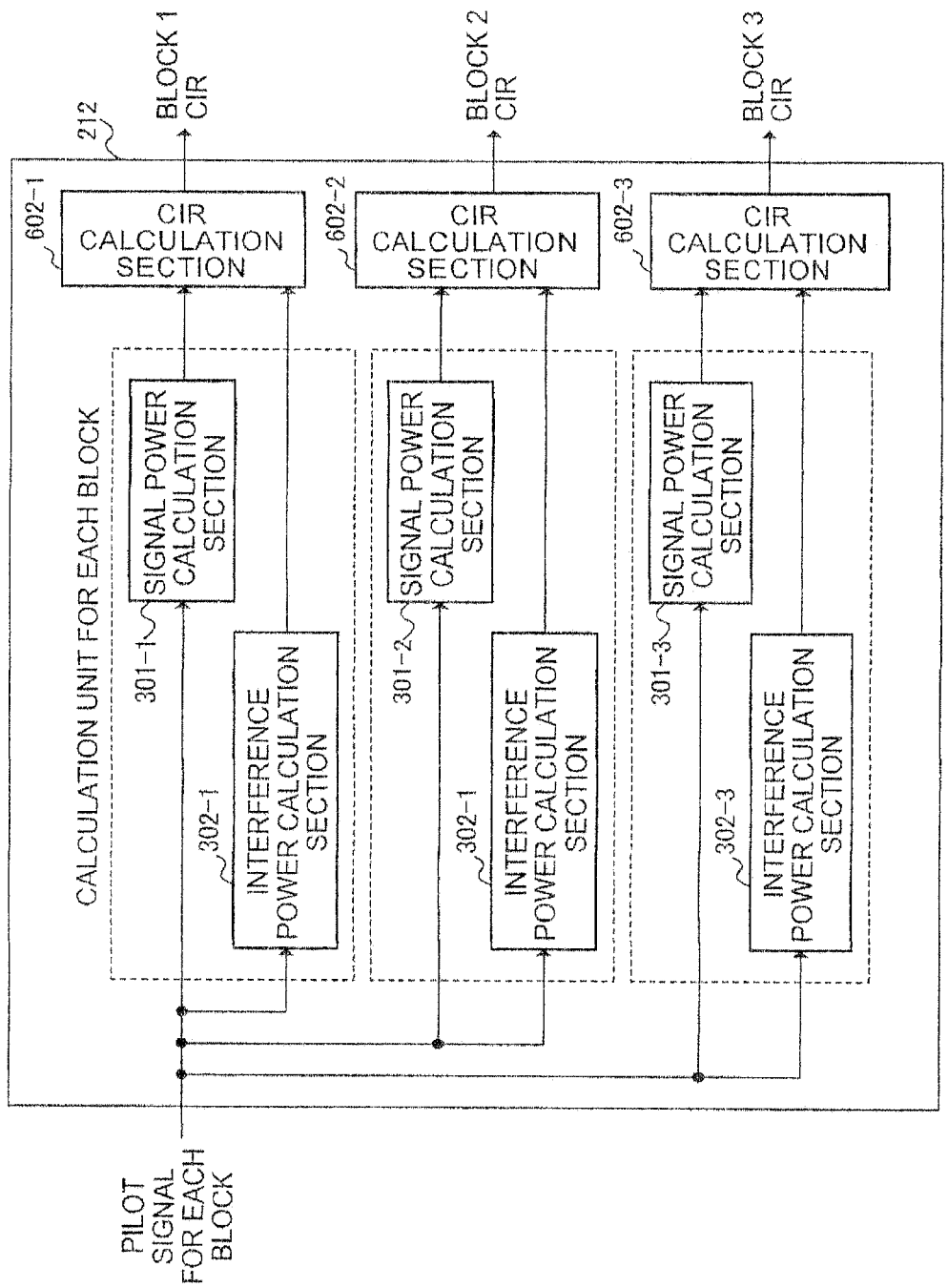
FIG. 8 is a block diagram showing the configuration of a CIR measuring section of the communication terminal apparatus according to Embodiment 1 of the present invention.

Next, the internal configuration of the CIR measuring section 212 will be explained. FIG. 8 is a block diagram showing the configuration of the CIR measuring section of the communication terminal apparatus according to this embodiment.

Signal power calculation sections 301-1 to 301-3 calculate power values of desired signals of the respective subcarrier blocks and output the power values to CIR calculation sections 303-1 to 303-3.

Interference power calculation sections 302-1 to 302-3 calculate power values of interference signals of the respective subcarrier blocks and output the power values to the CIR calculation section 303-1 to 303-3.

The CIR calculation sections 303-1 to 303-3 calculate the ratio of a desired signal to an interference signal and output the ratio to the CQI generation section 213.

Thus, according to the communication terminal apparatus of this embodiment, received signals subjected to frequency hopping are restored to original signals in subcarrier block units. Through such hopping, it is possible to reduce interference between cells, use frequencies in a good propagation situation and realize high-speed transmission.

Note that the transmission HARQ sections 105-1,105-2 and reception HARQ section 208 in the above explanations may be omitted. Furthermore, a case where a communication is carried out with a fixed MCS can also be considered.

Embodiment 2

Figure 9:
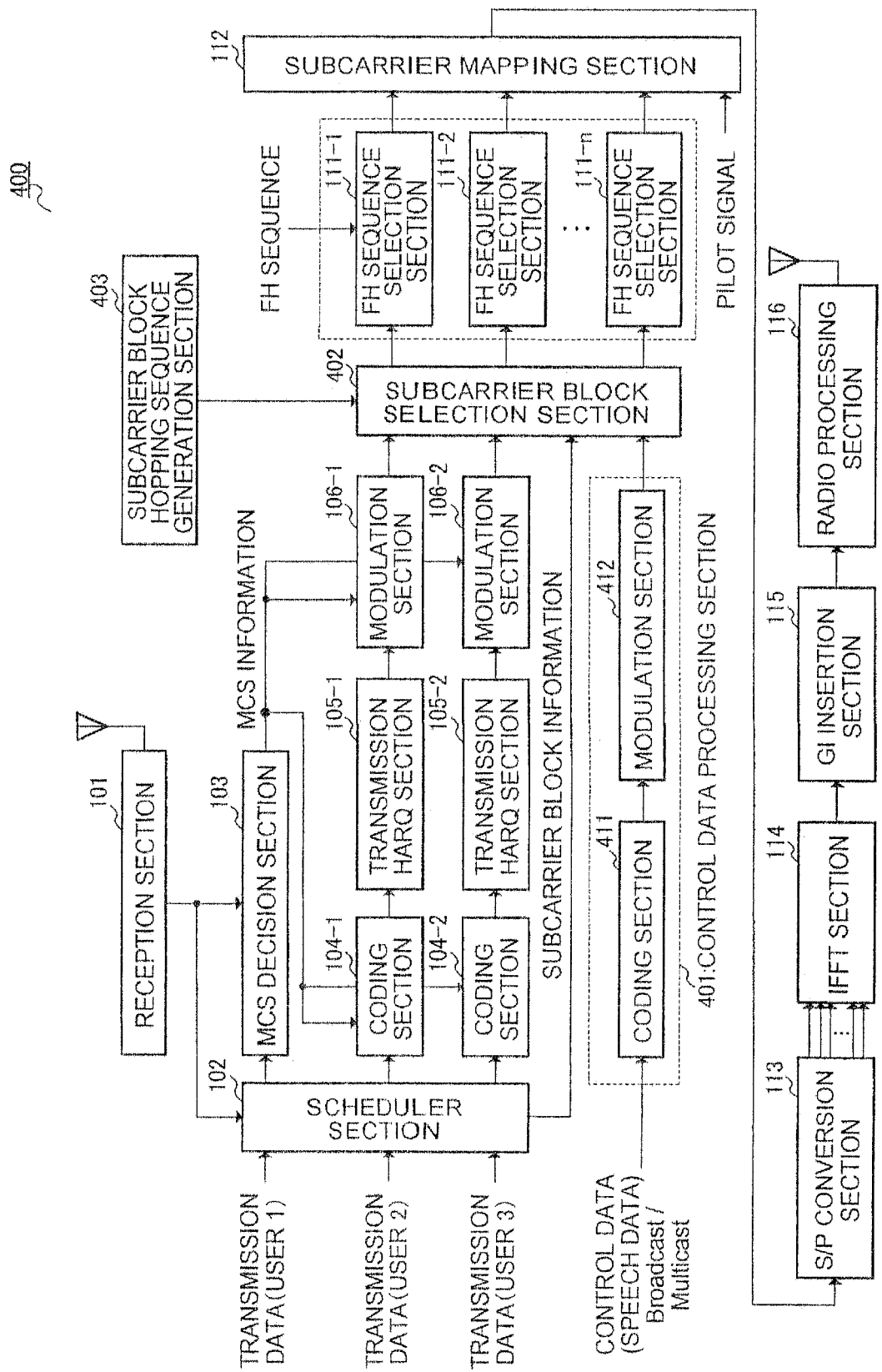
FIG. 9 is a block diagram showing the configuration of a base station apparatus according to Embodiment 2 of the present invention.

FIG. 9 is a block diagram showing the configuration of a base station apparatus according to Embodiment 2 of the present invention. However, those having the same configurations as those in FIG. 5 are assigned the same reference numerals as those in FIG. 5 and detailed explanations thereof will be omitted.

The base station apparatus 400 in FIG. 9 differs from the base station apparatus in FIG. 5 in that it is provided with a control data processing section 401, a subcarrier block selection section 402 and a subcarrier block hopping sequence generation section 403 and subcarrier blocks are subjected to hopping also for a control channel and a channel which sequentially transmits speech, etc., at a low rate. The control data processing section 401 is mainly constructed of a coding section 411 and a modulation section 412.

In FIG. 9, the coding section 411 carries out coding on control data, speech data, broadcast signal and multicast signal and outputs the coded signals to the modulation section 412. The modulation section 412 modulates the control data, speech data, broadcast signal and multicast signal and outputs the modulated signals to the subcarrier block selection section 402.

The subcarrier block selection section 402 assigns subcarrier blocks instructed by a scheduler section 102 to the respective user signals. For the respective subcarrier blocks, hopping patterns are selected by FH sequence selection sections 111-1 to 111-n.

Furthermore, the subcarrier block selection section 402 receives a hopping sequence of subcarrier blocks from the subcarrier block hopping sequence generation section 403. The subcarrier block selection section 402 assigns subcarrier blocks to the control data, speech data, broadcast signal and multicast signal output from the modulation section 412 according to this hopping sequence. For these subcarrier blocks, the FH sequence selection sections 111-1 to 111-n also select hopping patterns as in the case of user signals.

The subcarrier block hopping sequence generation section 403 generates a sequence (pattern) for causing the subcarrier blocks to which control data is mapped to hop around, over time. Here, a predetermined sequence is generated for each base station. The subcarrier block hopping sequence generation section 403 instructs the subcarrier block selection section 402 on the subcarrier blocks to be assigned to the control data in current transmission units according to the sequence generated.

Figure 10:
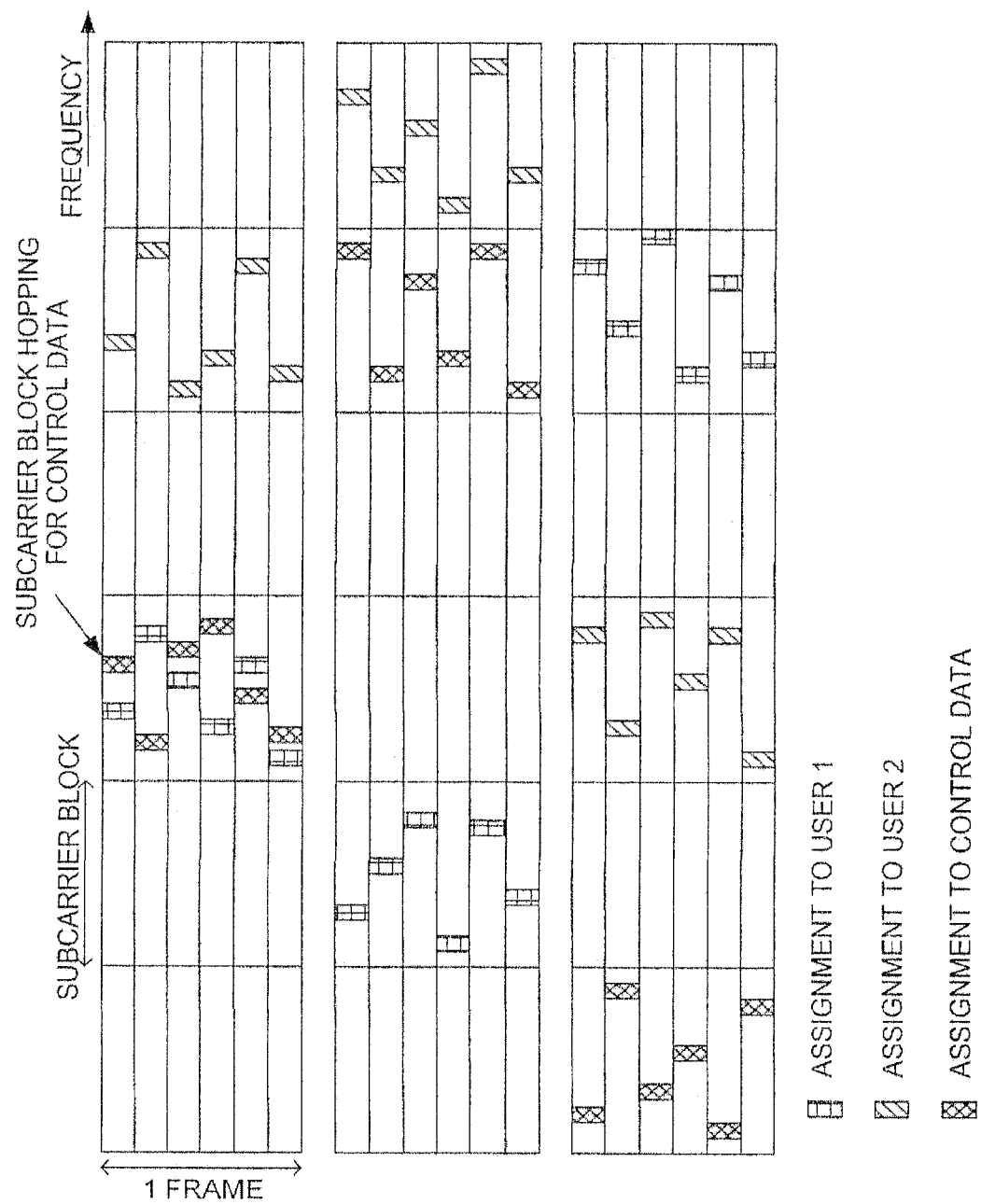
FIG. 10 illustrates an example of subcarrier mapping of the base station apparatus according to Embodiment 2 of the present invention.

FIG. 10 illustrates an example of subcarrier mapping of the base station apparatus of this embodiment. In FIG. 10, the horizontal axis shows subcarrier frequencies and the vertical axis shows time in frame units.

As shown in FIG. 10, the control data (in addition, speech data, broadcast signal and multicast signal) are subjected to frequency hopping in subcarrier block units. The subcarrier blocks for signal mapping are determined for every frame.

Thus, the base station apparatus according to this embodiment also subjects subcarrier blocks to hopping for control channels and channels for sequentially transmitting speech, etc., at a low rate, and therefore it is possible to obtain a frequency diversity effect, obtain uniform and stable reception quality and improve speech quality.

Furthermore, when carrying out transmission using scheduling for low-rate signals, the ratio of control signals in the signal amount (ratio of overhead) increases, which is not efficient. However, it is possible to realize efficient transmission by carrying out hopping of such subcarrier blocks.

Furthermore, broadcast information, multicast information and subcarrier blocks used for news delivery are also subjected to hopping. This improves reception quality for information transmitted to many users through a frequency diversity effect.

Embodiment 3

Users on a cell boundary receive strong interference from adjacent cells. Since users in other cells do not know to which subcarrier blocks they are assigned next and the users cannot predict an amount of interference. Therefore, for the users on a cell boundary, their subcarrier blocks may receive a small amount of interference and have a high CIR at an actual moment but may have a greater amount of interference next moment. When measuring a CIR as the reception quality feed back by a communication terminal apparatus, this embodiment uses a measured value for each block as signal power (C) and uses an average value of interference power of respective blocks as interference power (I).

Figure 11:
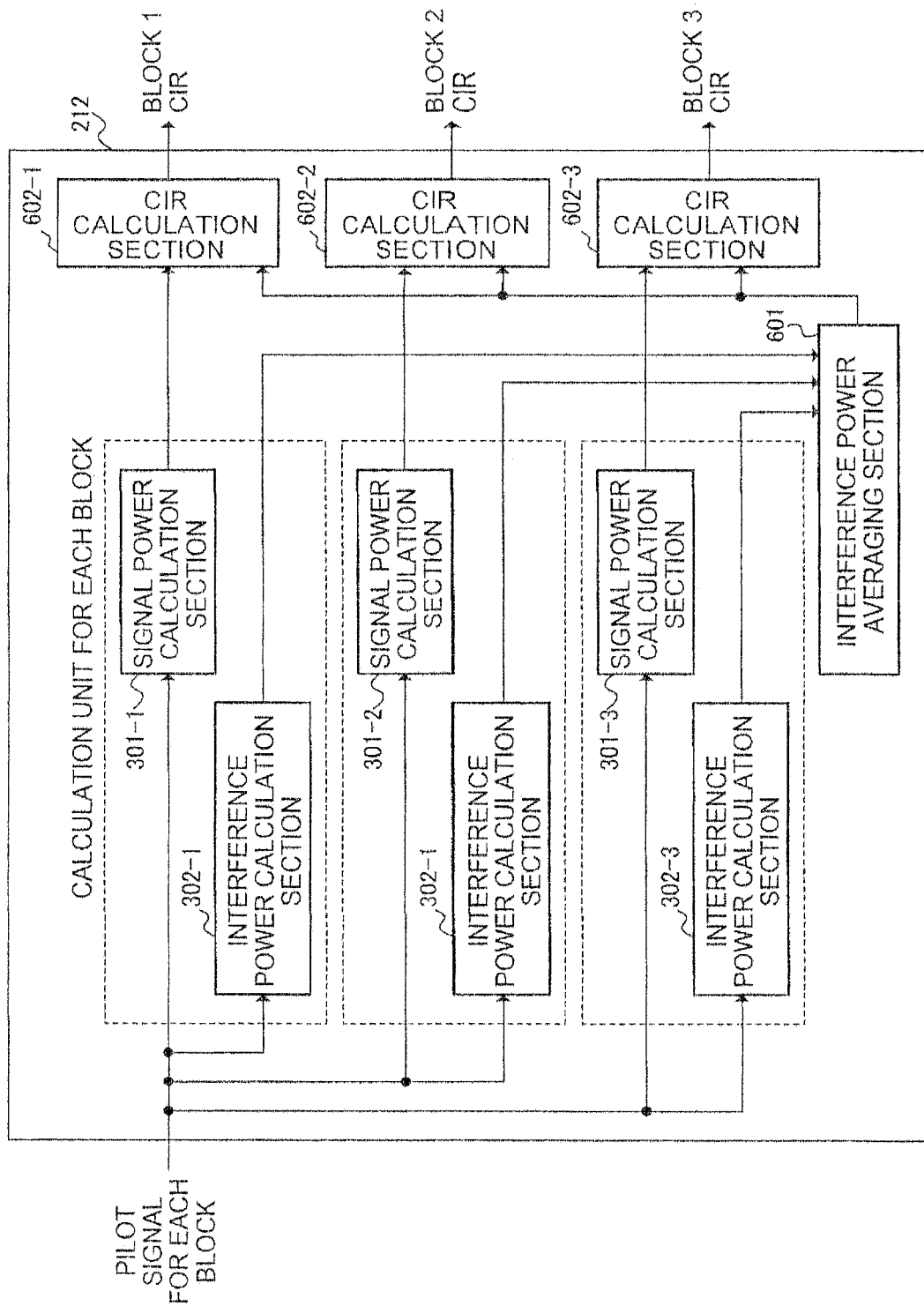
FIG. 11 illustrates the configuration of a CIR measuring section of a base station apparatus according to Embodiment 3 of the present invention.

FIG. 11 illustrates the configuration a CIR measuring section of the base station apparatus according to Embodiment 3 of the present invention. However, components having the same configurations as those in FIG. 8 are assigned the same reference numerals as those in FIG. 8 and explanations thereof will be omitted. The CIR measuring section in FIG. 11 is different from the CIR measuring section in FIG. 8 in that it is provided with an interference power averaging section 601, CIR calculation sections 602-1 to 602-3, calculates an average value of interference power and calculates a CIR from this average value.

Signal power calculation sections 301-1 to 301-3 calculate power values of desired signals of the respective subcarrier blocks and output the power values to the CIR calculation sections 602-1 to 602-3.

Interference power calculation sections 302-1 to 302-3 calculate power values of interference signals of the respective subcarrier blocks and output the power values to the interference power averaging section 601.

The interference power averaging section 601 calculates an average value of the power of interference signals calculated by the interference power calculation sections 302-1 to 302-3 and outputs the average value to the CIR calculation sections 602-1 to 602-3.

The CIR calculation sections 602-1 to 602-3 calculate a ratio of the power value of a desired signal for each subcarrier block to the average power value of an interference signal and output the ratio to the CQI generation section 213.

Thus, the communication terminal apparatus according to this embodiment measures interference power for each subcarrier block, calculates an average value of interference power of a plurality of subcarrier blocks and calculates a ratio of the power value of a desired signal of each subcarrier block to the average value of interference power as a CIR. This makes it possible to reduce influences of unpredictable variations of interference, measure more accurate channel reception quality, and thereby allow a base station apparatus to select more suitable subcarrier blocks and improve throughput. This also leads to a selection of an optimal MCS.

Embodiment 4

Embodiment 4 will explain an example where the size of a subcarrier block is made variable for each cell.

In general, cells having a small radius are arranged in urban areas because there is a high user density, while cells having a large radius are arranged in suburbs. Delay variance is small (1 µs or less) in the case of a small cell, while delay variance is large (5 µs or above) in the case of a large cell.

Figure 12:
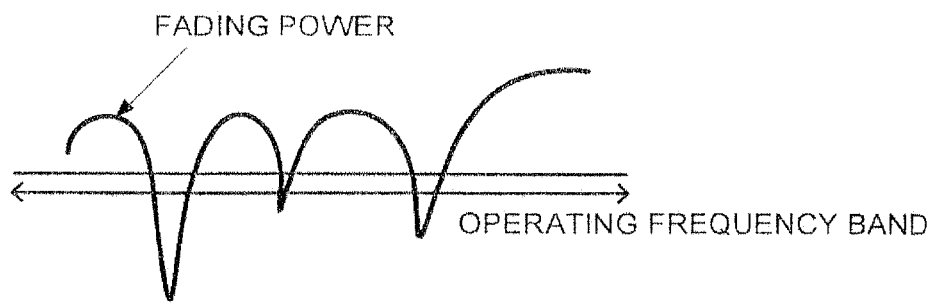
FIG. 12 illustrates an example of fading variation according to Embodiment 4 of the present invention.
Figure 13:
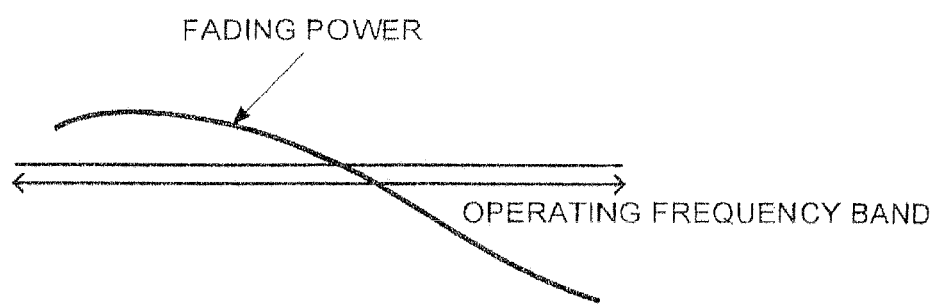
FIG. 13 illustrates an example of fading variation according to Embodiment 4 of the present invention.

FIG. 12 and FIG. 13 show examples of a fading variation. In FIG. 12 and FIG. 13, the horizontal axis shows a frequency used for a communication and the vertical axis shows the magnitude of fading variation.

FIG. 12 is an example where delay variance is large. As shown in FIG. 12, when there is large delay variance, fading in the frequency direction changes drastically, and reception power changes within subcarrier blocks unless the sizes of the subcarrier blocks are reduced, which makes it impossible to assign optimum subcarriers according to reception quality of the respective users. Furthermore, it is a general practice to decide an MCS from a CIR on the premise that the reception quality is substantially constant, but when a fading variation is large within a block, the accuracy of MCS selection also deteriorates.

FIG. 13 shows an example where delay variance is small. As shown in FIG. 13, when delay variance is small, a fading variation in the frequency direction is small, and therefore there is no problem even if the size of a subcarrier block is relatively large. On the other hand, when the size of the subcarrier block is too small, the amount of control signal such as report on the reception quality of subcarrier blocks and downlink assignment information increases. From the tradeoff between them, it is imaginable that there exist optimum values in the sizes of subcarrier blocks according to the radius of the cell.

Figure 14:
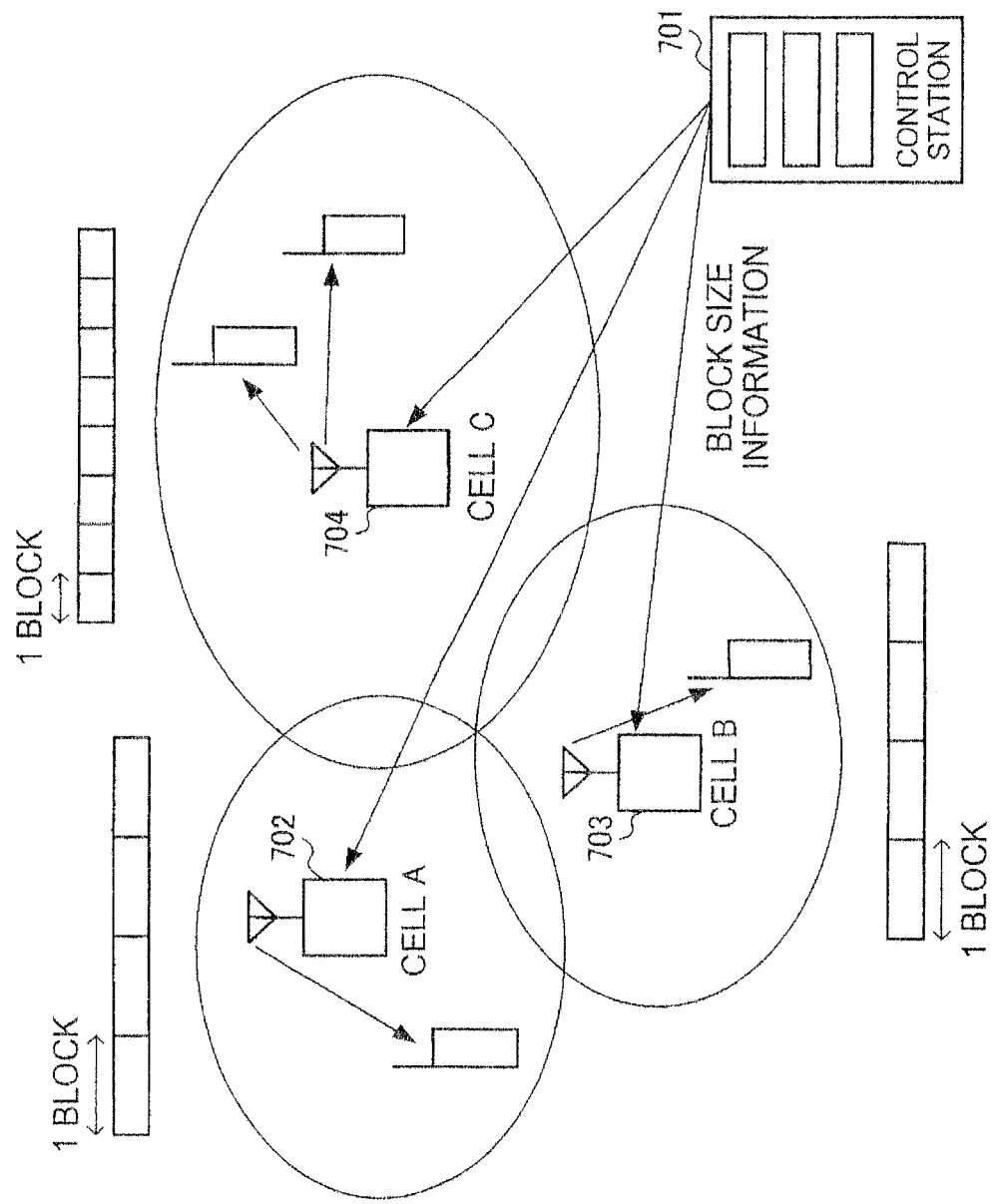
FIG. 14 illustrates a concept of Embodiment 4 of the present invention.

Therefore, Embodiment 4 makes the block size variable for each cell and sets a value corresponding to the cell size. FIG. 14 illustrates the concept of Embodiment 4 of the present invention. Suppose cell A at top left and cell B at bottom left are small cells and cell C at top right is a large cell. For cell A and cell B, each block size is increased and 4 blocks are set. For cell C, each block size is reduced and a total of 8 blocks are set. A control station 701 notifies base station apparatuses 702, 703 and 704 of the block sizes of the respective cells. The control station 701 notifies this to the base station apparatuses 702, 703 and 704 as annunciation information. Each cell carries out processing according to Embodiments 1 to 3 in the respective block sizes notified.

Here, when a comparison is made with respect to the amount of control signal, there is a CQI (e.g., 6 bits) of each subcarrier block measured by a communication terminal apparatus on the uplink. Since cells A, B require CQIs for 4 blocks, only 24 bits are required, but cell C requires 48 bits.

On the downlink, there is information as to which subcarrier block should be used. Since cells A, B require the information for 4 blocks, only 4 bits are required, but cell C requires the information for 8 blocks, and so it requires 8 bits. (In the case where a plurality of subcarrier blocks can be assigned)

Furthermore, it is necessary to send an MCS (e.g., 6 bits) of each subcarrier block. For cells A, B, only 4×6=24 bits are required, while cell C requires 8×6=48 bits. Though the amount of control information increases in cell C, high accuracy control according to a fading variation in the frequency direction is available.

Figure 15:
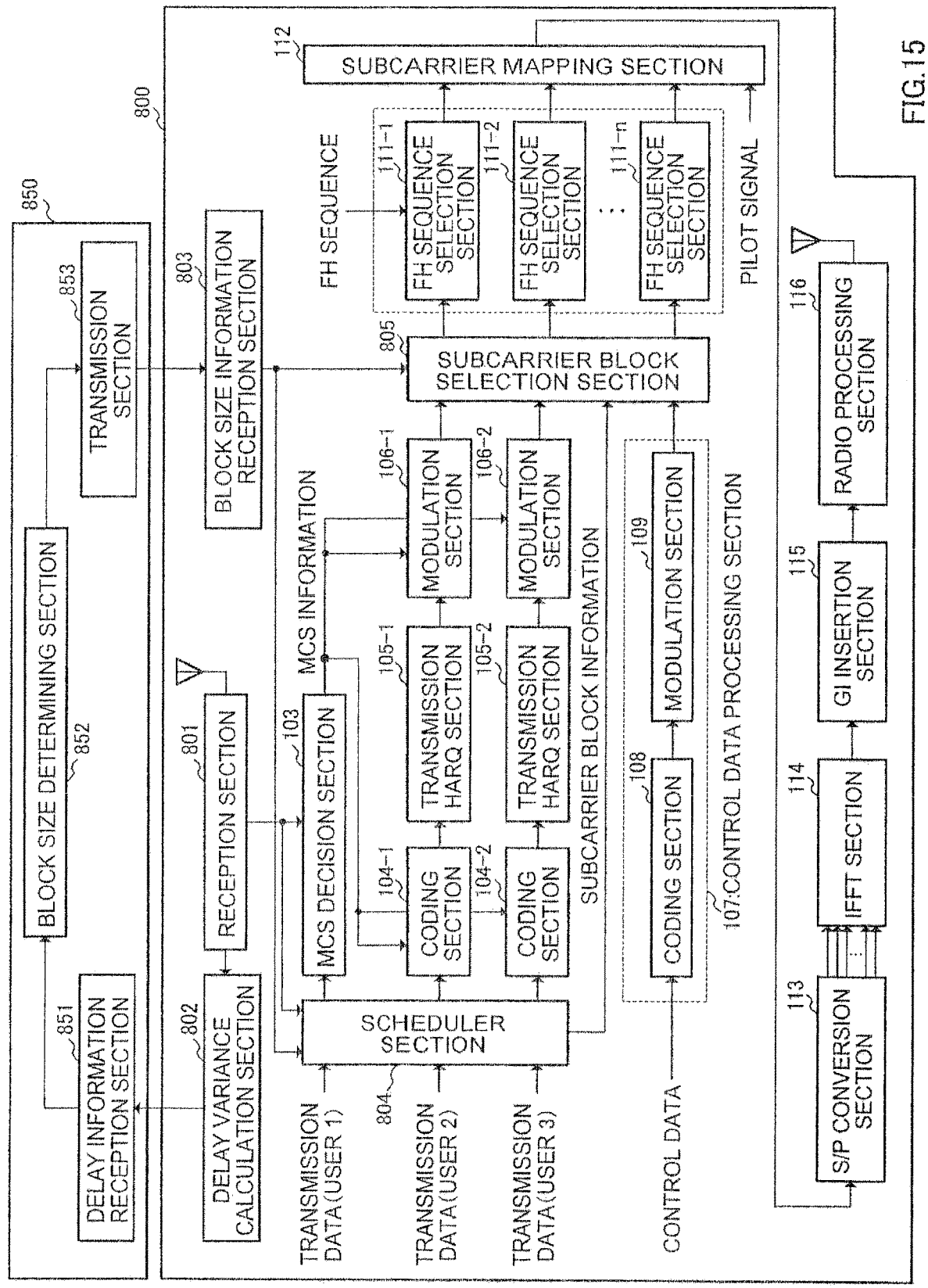
FIG. 15 is a block diagram showing the configuration of a base station apparatus and control station apparatus according to Embodiment 4 of the present invention.

Next, the inner configuration of the base station apparatus of this embodiment will be explained. FIG. 15 is a block diagram showing the configurations of the base station apparatus and control station apparatus according to this embodiment. However, the components having the same configurations as those in FIG. 5 are assigned the same reference numerals as those in FIG. 5 and detailed explanations thereof will be omitted.

The base station apparatus 800 in FIG. 15 is different from the base station apparatus in FIG. 5 in that it is provided with a reception section 801, a delay variance calculation section 802 and a block size information reception section 803 and selects small blocks when delay variance in a propagation path is large and selects large blocks when delay variance is small. Furthermore, the control station apparatus 850 in FIG. 15 is mainly constructed of a delay information reception section 851, a block size determining section 852 and a transmission section 853.

The reception section 801 receives a signal sent from a communication terminal apparatus which is the other party of communication, converts the frequency of this received signal to a baseband signal, decodes the baseband signal and extracts CQI. The reception section 801 outputs the CQI to a scheduler section 804 and an MCS decision section 103. Furthermore, the reception section 801 also outputs the received signal to the delay variance calculation section 802.

The delay variance calculation section 802 calculates the magnitude of delay variance of the propagation path from the received signal and outputs it to the delay information reception section 851.

The delay information reception section 851 receives information on the delay variance output from the base station apparatus 800 and outputs the information to the block size determining section 852. Note that the information on the delay variance received is information on the delay variance output from a plurality of base station apparatuses as shown in FIG. 14.

The block size determining section 852 selects small blocks for a cell having large delay variance in the propagation path based on the information on the delay variance output from a plurality of base stations and selects large blocks for a cell having small delay variance. Here, a small block indicates a subcarrier block having a small number of subcarriers and a large block indicates a subcarrier block having a large number of subcarriers.

The transmission section 853 outputs information on the block size determined by the block size determining section 852 to the block size information reception section 803 of each base station apparatus.

The block size information reception section 803 outputs the received information on the block size to the scheduler section 804 and subcarrier block selection section 805.

The scheduler section 804 carries out scheduling for determining to which user data should be sent using CQI from each communication terminal apparatus and selects a user signal to be sent in the next frame. As the scheduling method, algorithms such as MaxC/I method and Round Robin method are available. At this time, the scheduler section 804 also determines in which subcarrier block of the subcarrier blocks in the block size determined by the block size determining section 852 transmission is performed and outputs the information to the subcarrier block selection section 805. Here, the scheduler section 804 selects a subcarrier block in the best propagation path.

The subcarrier block selection section 805 selects subcarrier blocks instructed from the scheduler section 804 out of the subcarrier blocks in the block size determined by the block size determining section 852 for the respective user signals. Furthermore, FH sequence selection sections 111-1 to 111-*n* select hopping patterns for the respective subcarrier blocks.

Thus, according to the control station apparatus and base station apparatus of this embodiment, it is possible to reduce the amount of control signal by selecting small blocks for a cell having large delay variance in the propagation path and large blocks for a cell having small delay variance.

Note that the control station apparatus and base station apparatus according to this embodiment is applicable not only to an FH-OFDM scheme but also to other multicarrier communication schemes. Furthermore, it is also possible to integrate the control station apparatus and base station apparatus and determine block sizes using delay variance of one base station apparatus.

The present invention is not limited to the above described embodiments and can be implemented modified in various ways. For example, the above described embodiments have explained the case where the invention is implemented as a base station apparatus but instead of this, this communication method can also be implemented by software.

For example, it is possible to store a program for executing the above described communication method in a ROM (Read Only Memory) beforehand and cause a CPU (Central Processor Unit) to operate the program.

Furthermore, it is also possible to store a program for implementing the above described communication method in a computer-readable storage medium, record the program stored in the storage medium in a RAM (Random Access Memory) of a computer and cause the computer to operate according to the program.

Thus, the present invention divides a band into subcarrier blocks, selects subcarrier blocks used in frame units through frequency scheduling, subject respective user signals to frequency hopping within the blocks, and can thereby reduce interference between cells through hopping, use frequencies in good propagation situations and realize high-speed transmission. Furthermore, the invention divides the band, and can thereby reduce the number of patterns of frequency hopping and reduce the amount of control information on resource assignment to the respective users.

Furthermore, the invention also subjects subcarrier blocks to hopping and obtains a frequency diversity effect, and can thereby obtain uniform and stable reception quality for a control channel and channels such as speech requiring uniform quality at a low rate and realize stable communications.

Furthermore, by restoring a received signal subjected to frequency hopping to the original signal in subcarrier block units, it is possible to reduce interference between cells through hopping, use frequencies in a good propagation situation and realize high-speed transmission.

Furthermore, by measuring interference power for every subcarrier block, calculating an average value of interference power of a plurality of subcarrier blocks and calculating the ratio of a power value of a desired signal of each subcarrier block to an average value of interference power as a CIR, it is possible to reduce influences of unpredictable variation of interference and measure more accurate channel reception quality and thereby allow the base station apparatus to select more suitable subcarrier blocks, which improves throughput and also leads to a selection of a more suitable MCS.

As explained so far, the present invention can reduce interference between cells and realize high-speed transmission using frequencies in a good propagation situation.

This application is based on the Japanese Patent Application No. 2003-102018 filed on Apr. 4, 2003, entire content of which is expressly incorporated by reference herein.

The invention claimed is:

1. A communication apparatus comprising:
a controller, which, in operation, (i) maps control information to a single determined block among a plurality of blocks of one frame into which a frequency band is divided, and (ii) maps data to a block selected from the plurality of the blocks of the one frame, the selected block being indicated by the control information; and
a transmitter, which, in operation, transmits the control information and the data, wherein the control information is mapped to the single determined block by frequency hopping the control information within the single determined block.

2. The communication apparatus according to claim 1, wherein the data is mapped by frequency hopping the data within the selected block.

3. The communication apparatus according to claim 1, wherein a plurality of control information for a plurality of data are mapped to the single determined block.

4. A communication method comprising:
mapping control information to a single determined block among a plurality of blocks of one frame into which a frequency band is divided;
mapping data to a block selected from the plurality of the blocks of the one frame, the selected block being indicated by the control information; and
transmitting the control information and the data,
wherein the control information is mapped to the single determined block by frequency hopping the control information within the single determined block.

5. The communication method according to claim 4, wherein the data is mapped by frequency hopping the data within the selected block.

6. The communication method according to claim 4, wherein a plurality of control information for a plurality of data are mapped to the single determined block.

7. The communication apparatus according to claim 2, wherein the frequency hopping of the control information is within a first subcarrier of the frequency band, and the frequency hopping of the data is within a second subcarrier of the frequency band and not within the first subcarrier.

* * * * *